United States Patent
Tao

(10) Patent No.: US 9,801,252 B2
(45) Date of Patent: Oct. 24, 2017

(54) RETROFIT LIGHT EMITTING DIODE TUBE

(71) Applicant: PHILIPS LIGHTING HOLDING B.V., Eindhoven (NL)

(72) Inventor: Haimin Tao, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/895,555

(22) PCT Filed: Jun. 16, 2014

(86) PCT No.: PCT/EP2014/062538
§ 371 (c)(1),
(2) Date: Dec. 3, 2015

(87) PCT Pub. No.: WO2014/206785
PCT Pub. Date: Dec. 31, 2014

(65) Prior Publication Data
US 2016/0113091 A1    Apr. 21, 2016

(30) Foreign Application Priority Data

Jun. 27, 2013  (EP) ..................... 13173977

(51) Int. Cl.
*H05B 37/02* (2006.01)
*H05B 33/08* (2006.01)

(52) U.S. Cl.
CPC ..... *H05B 33/0884* (2013.01); *H05B 33/0809* (2013.01); *Y02B 20/341* (2013.01); *Y02B 20/383* (2013.01); *Y02B 20/386* (2013.01)

(58) Field of Classification Search
CPC ............ H05B 33/0884; H05B 33/0809; H05B 33/0806; H05B 37/02; Y02B 20/383; Y02B 20/386; Y02B 20/341
(Continued)

(56) References Cited

U.S. PATENT DOCUMENTS

| 6,989,635 | B2 * | 1/2006 | Iwaki | H05B 33/0809 315/200 A |
| 2006/0193131 | A1 * | 8/2006 | McGrath | H05B 33/0803 362/227 |

(Continued)

FOREIGN PATENT DOCUMENTS

| JP | 576061 U | 10/1993 |
| JP | 1197747 A | 4/1999 |

(Continued)

*Primary Examiner* — Jimmy Vu
*Assistant Examiner* — Henry Luong
(74) *Attorney, Agent, or Firm* — Akarsh P. Belagodu

(57) ABSTRACT

Light sources (10) for replacing fluorescent lamps comprise light circuits (3) with light emitting diodes, first and second terminals (1, 2) located at first and second ends of the light sources (10) for exchanging first signals with high-frequency ballasts, and converter circuits (4) for converting the first signals into second signals for feeding the light circuits (3). The converter circuits (4) comprise reactive circuits (5) for matching the light circuits (3) and the high-frequency ballasts and provide safety to persons when installing the light sources (10). The light sources (10) may further comprise protection circuits (7, 8) for protecting parts of the light sources (10) against problems. The protection circuits (7, 8) may comprise monitor circuits (7) for monitoring parameters of the light sources (10) and for in response to monitoring results short-circuiting outputs of the converter circuits (4), and fuses (8). The reactive circuits (5) may comprise protecting capacitors (51, 52).

12 Claims, 4 Drawing Sheets

(58) Field of Classification Search
USPC ......... 315/185 R, 187, 200 R, 291, 307–308
See application file for complete search history.

(56) References Cited

U.S. PATENT DOCUMENTS

| | | | |
|---|---|---|---|
| 2008/0266849 A1 | 10/2008 | Nielson et al. | |
| 2008/0290814 A1* | 11/2008 | Leong | F21K 9/00 |
| | | | 315/294 |
| 2010/0033095 A1 | 2/2010 | Sadwick | |
| 2010/0096976 A1* | 4/2010 | Park | H05B 33/0803 |
| | | | 313/498 |
| 2010/0225251 A1 | 9/2010 | Maruyama | |
| 2011/0234997 A1* | 9/2011 | Saito | G03B 21/2026 |
| | | | 353/85 |
| 2011/0260614 A1 | 10/2011 | Hartikka et al. | |
| 2011/0298375 A1* | 12/2011 | Canter | H05B 33/0815 |
| | | | 315/53 |
| 2012/0086356 A1* | 4/2012 | Chan | H05B 33/0815 |
| | | | 315/294 |
| 2012/0181952 A1 | 7/2012 | Roeer | |
| 2012/0313540 A1* | 12/2012 | Lin | F21V 23/003 |
| | | | 315/201 |
| 2013/0094203 A1 | 4/2013 | Mangiaracina | |
| 2015/0351171 A1* | 12/2015 | Tao | H05B 37/02 |
| | | | 315/185 R |

FOREIGN PATENT DOCUMENTS

| | | |
|---|---|---|
| JP | H11162234 | 6/1999 |
| JP | 2007012322 A | 1/2007 |
| JP | 2007287617 A | 11/2007 |
| JP | 2008263203 A | 10/2008 |
| JP | 2008277188 A | 11/2008 |
| JP | 2009303280 A | 12/2009 |
| JP | 2010157486 A | 7/2010 |
| JP | 2010182666 A | 8/2010 |
| JP | 2010238661 A | 10/2010 |
| JP | 2011049075 A | 3/2011 |
| JP | 2013543642 A | 12/2013 |
| NL | WO 2012052875 A3 * | 6/2012 ......... H05B 33/0809 |
| WO | 2012052875 A2 | 4/2012 |
| WO | 2012068687 A1 | 5/2012 |
| WO | 2012104800 A2 | 8/2012 |
| WO | 2012110973 A1 | 8/2012 |

* cited by examiner

RETROFIT LIGHT EMITTING DIODE TUBE

CROSS-REFERENCE TO PRIOR APPLICATIONS

This application is the U.S. National Phase application under 35 U.S.C. §371 of International Application No. PCT/EP2014/062538, filed on Jun. 16, 2014, which claims the benefit of European Patent Application No. 13173977.3, filed on Jun. 27, 2013. These applications are hereby incorporated by reference herein.

FIELD OF THE INVENTION

The invention relates to a light source comprising a light circuit with one or more light emitting diodes. Examples of such a light source are retrofit light emitting diode tubes.

BACKGROUND OF THE INVENTION

U.S. 2012/0181952 A1 discloses a drive circuit for a light emitting diode array. To enable a safe mounting, the drive circuit comprises a safety circuit for controlling a relay. Such a relay is disadvantageous.

SUMMARY OF THE INVENTION

It is an object of the invention to provide an improved light source comprising a light circuit with one or more light emitting diodes.

According to a first aspect, a light source is provided comprising
  first and second terminals for exchanging a first signal with a high-frequency ballast, the first terminal being located at a first end of the light source and the second terminal being located at a second end of the light source,
  a light circuit with one or more light emitting diodes, and
  a converter circuit for converting the first signal into a second signal for feeding the light circuit, the converter circuit comprising a reactive circuit for matching the light circuit and the high-frequency ballast and for providing safety to a person when installing the light source.

Via the first and second terminals of the light source, the first signal such as for example an alternating-current (AC) current signal is exchanged with the high-frequency ballast, also known as electronic ballast. Such a high-frequency ballast operates at for example 1 kHz or 10 kHz or 20 kHz or 50 kHz or 100 kHz etc. The converter circuit converts the first signal into the second signal such as for example a direct-current (DC) current signal suited to feed the light circuit that comprises one or more light emitting diodes of whatever kind and in whatever combination. The converter circuit comprises a reactive circuit that has first and second functions. The first function is to match the light circuit and the high-frequency ballast, in other words it adjusts/defines amplitudes of the first and second signals. The second function is to provide safety to a person who is installing the light source, in other words it adjusts/defines the amplitude of the first signal such that safety to a person who is installing the light source is provided. As a result, an improved light source has been created, that no longer requires a disadvantageous relay to offer safety to a person who is installing the light source.

An embodiment of the light source is defined by further comprising
  a protection circuit for protecting a part of the light source against problems. Examples of these problems are voltage problems, such as a part of the light source being confronted with a too large voltage value, current problems, such as a part of the light source being confronted with a too large current value, and temperature problems, such as a part of the light source becoming too hot.

An embodiment of the light source is defined by the protection circuit comprising
  a monitor circuit for monitoring one or more parameters of the light source and for in response to a monitoring result short-circuiting first and second outputs of the converter circuit. The monitor circuit will monitor one or more parameters of the light source. By short-circuiting the first and second outputs of the converter circuit in response to a monitoring result, a relatively small impedance is created between the first and second outputs, and an amplitude of a voltage signal present across these first and second outputs will get a relatively small value. This way, the protection circuit will protect the light source against the problems.

An embodiment of the light source is defined by the one or more parameters comprising a first parameter defined by an amplitude of a voltage signal present across the first and second outputs of the converter circuit and a second parameter defined by an amplitude of a current signal flowing through the light circuit and a third parameter defined by a temperature of the part of the light source. Via these first, second and third parameters, the protection circuit will protect the light source against the voltage, current and temperature problems.

An embodiment of the light source is defined by the monitor circuit comprising a thyristor, first and second main electrodes of the thyristor being coupled to the first and second outputs of the converter circuit, a control electrode of the thyristor being coupled via a diac or a zener diode to an output of a transistor circuit or an output of a voltage divider for said monitoring. This is a simple, robust and low cost embodiment. The transistor circuit and the voltage divider may have many embodiments.

An embodiment of the light source is defined by the protection circuit comprising
  a fuse located in a current path between one of the first and second terminals and the converter circuit. The fuse may be a mechanical fuse or an electrical fuse and may be considered to be an alternative to a monitor circuit for monitoring a second parameter defined by an amplitude of a current signal flowing through the light circuit and a third parameter defined by a temperature of a part of the light source. The fuse may for example be a regular (current) fuse of may for example be a thermal fuse connected to a heat sink of the light circuit.

An embodiment of the light source is defined by the converter circuit comprising a rectifier bridge consisting of four diodes, or the reactive circuit comprising a rectifier bridge consisting of two diodes and two voltage-doubling capacitors. Compared to the rectifier bridge consisting of four diodes, the rectifier bridge consisting of two diodes and two voltage-doubling capacitors will increase an output voltage of the converter circuit and reduce an output current of the converter circuit. Owing to the fact that the rectifier bridge consisting of two diodes and two voltage-doubling capacitors defines/adjusts the amplitudes of the first and second signals, possibly in cooperation with (other) parts of the reactive circuit and the light circuit, the rectifier bridge consisting of two diodes and two voltage-doubling capacitors is considered to form part of the reactive circuit, where the alternative rectifier bridge consisting of four diodes can be considered to form part of the converter circuit. But alternatively, the rectifier bridge consisting of four diodes can also be considered to form part of the reactive circuit.

An embodiment of the light source is defined by the reactive circuit comprising one protecting capacitor or two or more serially connected protecting capacitors coupled to the first terminal and to a first input of the rectifier bridge, the second terminal being coupled to a second input of the rectifier bridge. The one protecting capacitor or the two or more serially connected protecting capacitors will define/adjust the amplitude of the first signal, possibly in combination with other elements of the converter circuit and the light circuit. Preferably, the one protecting capacitor or the two or more serially connected protecting capacitors will be mainly responsible for a value of the amplitude of the first signal. The second terminal may be coupled to the second input of the rectifier bridge directly or may be coupled indirectly via another element such as for example a fuse.

An embodiment of the light source is defined by the one protecting capacitor or the two or more serially connected protecting capacitors being coupled to the first input of the rectifier bridge via an inductive element. The inductive element may further smooth the first signal and thereby reduce electromagnetic interference.

An embodiment of the light source is defined by a first electrode of the inductive element being coupled via a first capacitive element to the second input of the rectifier bridge, or first and second electrodes of the inductive element being coupled via first and second capacitive elements to the second input of the rectifier bridge. The first capacitive element or the first and second capacitive elements will shunt a part of the first signal and thereby reduce an amplitude of the second signal.

An embodiment of the light source is defined by the first and second inputs of the rectifier bridge being coupled to each other via a first capacitive element. The first capacitive element will shunt a part of the first signal and thereby reduce an amplitude of the second signal.

An embodiment of the light source is defined by first and second outputs of the rectifier bridge being first and second outputs of the converter circuit, these first and second outputs being coupled to first and second electrodes of a storage capacitor and to first and second electrodes of the light circuit. The storage capacitor will smooth the second signal.

An embodiment of the light source is defined by the first terminal comprising two first pins interconnected via a first interconnection circuit, and the second terminal comprising two second pins interconnected via a second interconnection circuit. For a high-frequency ballast in the form of an instant start ballast, only one of the two pins per terminal needs to be used. For a high-frequency ballast in the form of a programmed start ballast, both pins per terminal are required.

An embodiment of the light source is defined by the first interconnection circuit comprising a first fuse and a first resistor connected serially, and the second interconnection circuit comprising a second fuse and a second resistor connected serially. This is a simple, robust and low cost embodiment.

An embodiment of the light source is defined by the light source being designed for replacing a fluorescent lamp while keeping the high-frequency ballast. Examples of such a light source are retrofit light emitting diode tubes.

An insight is that a relay is to be avoided. A basic idea is that a reactive circuit can be used for matching a light circuit and a high-frequency ballast and for providing safety to a person when installing a light source comprising the light circuit.

A problem to provide an improved light source has been solved. A further advantage is that the improved light source is simple, robust and low cost.

These and other aspects of the invention will be apparent from and elucidated with reference to the embodiments described hereinafter.

DETAILED DESCRIPTION OF EMBODIMENTS

Figure 1:
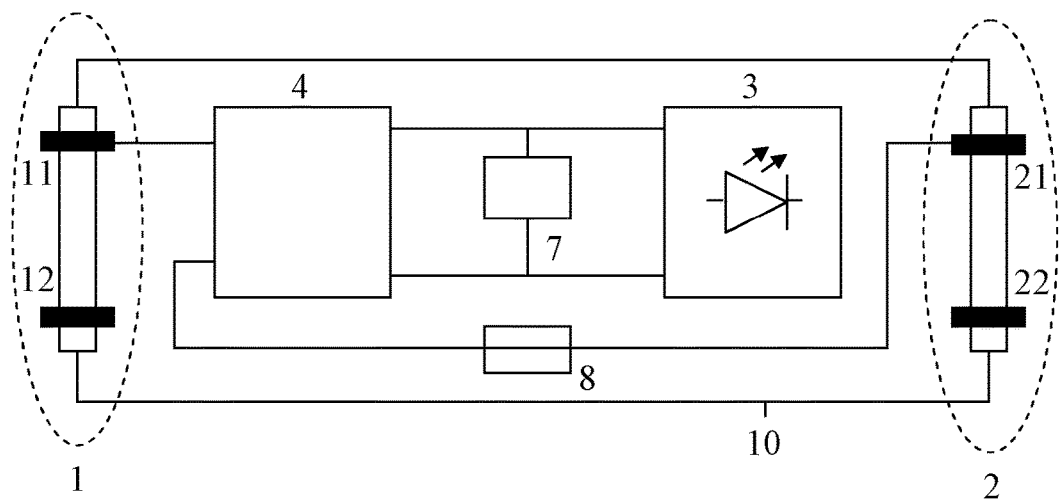
FIG. 1 shows a first embodiment of a light source.

In the FIG. 1, a first embodiment of a light source 10 is shown. The light source 10 comprises at a first end of a tube a first terminal 1 and at a second end of the tube a second terminal 2 for exchanging a first signal with a high-frequency ballast. The first terminal 1 comprises for example two first pins 11, 12 and the second terminal 2 comprises for example two second pins 21, 22. The light source 10 comprises a converter circuit 4 for converting the first signal into a second signal for feeding a light circuit 3 that comprises one or more light emitting diodes. The pin 11 is for example coupled to a first input of the converter circuit 4, and the pin 12 is not connected. The pin 21 is for example coupled to a second input of the converter circuit 4, and the pin 22 is not connected. First and second outputs of the converter circuit 4 are coupled to first and second electrodes of the light circuit 3. The converter circuit 4 comprises a reactive circuit for matching the light circuit 3 and the high-frequency ballast and for providing safety to a person when installing the light source 10. Examples of this reactive circuit are shown in the FIGS. 2, 3, 7 and 8.

The first signal is for example an alternating-current (AC) current signal and the second signal is for example a direct-current (DC) current signal suited to feed the light circuit 3. The light source 10 may further comprise a protection circuit 7, 8 for protecting a part of the light source 10 against problems. The protection circuit 7, 8 may for example comprise a monitor circuit 7 coupled to the first and second outputs of the converter circuit 4 for monitoring one or more parameters of the light source 10 and for in response to a monitoring result short-circuiting the first and second outputs of the converter circuit 4. The protection circuit 7, 8 may alternatively and/or in addition comprise a fuse 8 located in a current path between the pin 21 and the second input of the converter circuit 4. Examples of the fuse 8 are regular (current) fuses and thermal fuses.

Figure 2:
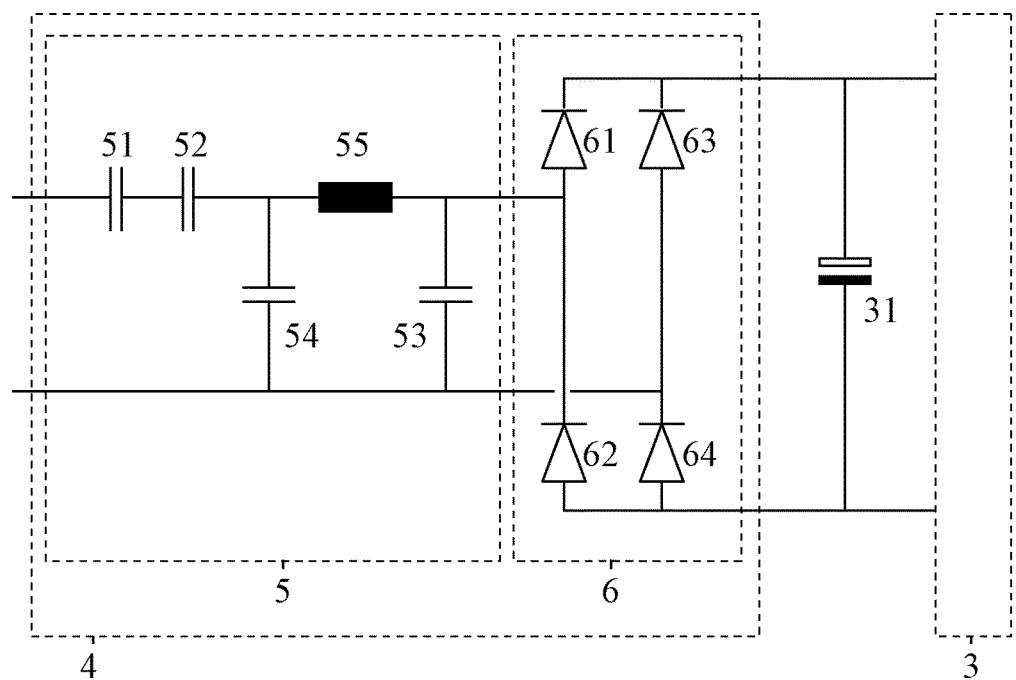
FIG. 2 shows a first embodiment of a converter circuit.

In the FIG. 2, a first embodiment of a converter circuit 4 is shown. Here, the converter circuit 4 comprises a reactive circuit 5 for matching the light circuit 3 and the high-frequency ballast and for providing safety to a person when installing the light source 10. The matching comprises for example adjusting/defining amplitudes of the first and second signals. Said providing comprises for example adjusting/defining the amplitude of the first signal such that safety to a person who is installing the light source 10 is realized. The converter circuit 4 here further comprises a rectifier bridge 6 consisting of four diodes 61-64. This reactive circuit 5 comprises one protecting capacitor 51 or two or more serially connected protecting capacitors 51, 52 coupled to the pin 11 and to a first input of the rectifier bridge 6 via an inductive element 55. The pin 21 is coupled to a second input of the rectifier bridge 6 possibly via the fuse 8.

A first electrode of the inductive element 55 is coupled via a first capacitive element 53 to the second input of the rectifier bridge 6, and a second electrode of the inductive element 55 is coupled via a second capacitive element 54 to the second input of the rectifier bridge 6. First and second outputs of the rectifier bridge 6 form the first and second outputs of the converter circuit 4 and are coupled to first and second electrodes of a storage capacitor 31 and to the first and second electrodes of the light circuit 3.

The protecting capacitors 51, 52 may each have an exemplary value of 1-10 nF, the inductive element 55 may have an exemplary value of 1-10 mH, and the capacitive elements 53, 54 may each have an exemplary value of 100-1000 pF, without having excluded other values. Alternatively, the first capacitive element 53 may be replaced by an "open", and/or the second capacitive element 54 may be replaced by an "open", and/or the inductive element 55 may be replaced by a "short". Alternatively, the rectifier bridge 6 may form part of the reactive circuit 5.

Figure 3:
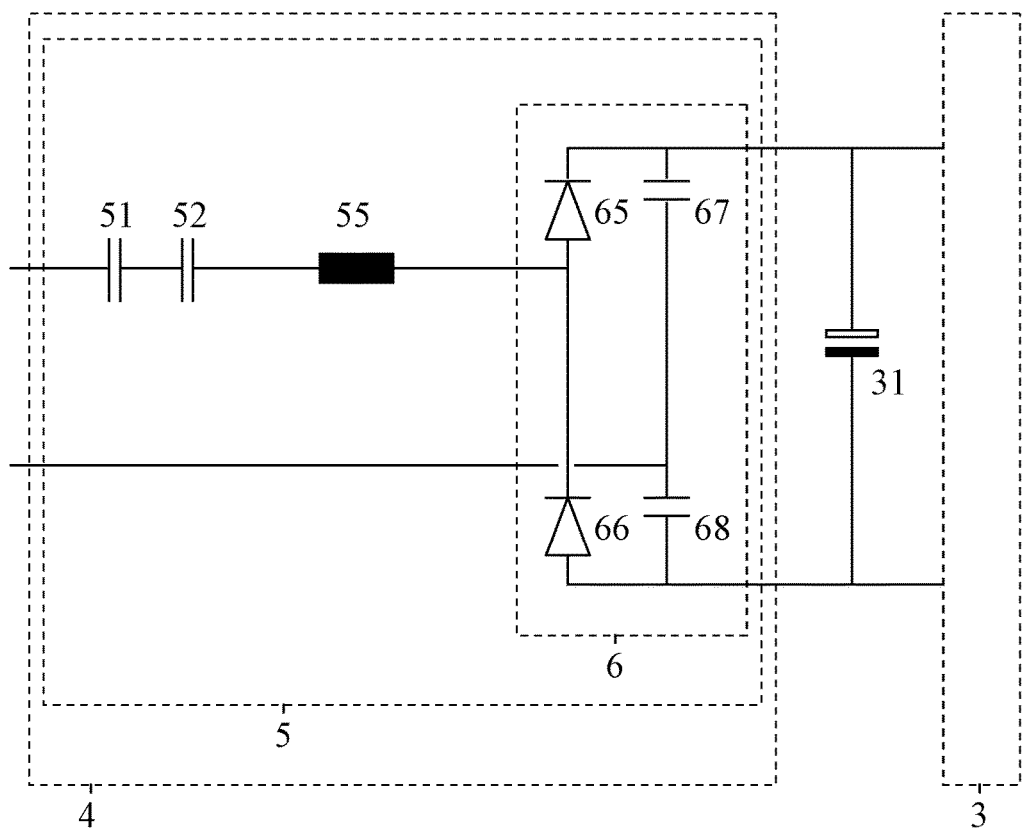
FIG. 3 shows a second embodiment of a converter circuit.

In the FIG. 3, a second embodiment of a converter circuit 4 is shown. Here, the converter circuit 4 comprises a reactive circuit 5 for matching the light circuit 3 and the high-frequency ballast and for providing safety to a person when installing the light source 10. The matching comprises for example adjusting/defining amplitudes of the first and second signals. Said providing comprises for example adjusting/defining the amplitude of the first signal such that safety to a person who is installing the light source 10 is realized. This time, the reactive circuit 5 comprises a rectifier bridge 6 consisting of two diodes 65, 66 and two voltage-doubling capacitors 67, 68. Compared to the rectifier bridge 6 consisting of four diodes 61-64, the rectifier bridge 6 consisting of two diodes 65, 66 and two voltage-doubling capacitors 67, 68 will increase an output voltage of the converter circuit 4 and reduce an output current of the converter circuit 4.

This reactive circuit 5 further comprises one protecting capacitor 51 or two or more serially connected protecting capacitors 51, 52 coupled to the pin 11 and to a first input of the rectifier bridge 6 (a common point between the diodes 65, 66) via an inductive element 55. The pin 21 is coupled to a second input of the rectifier bridge 6 (a common point between the voltage-doubling capacitors 67, 68) possibly via the fuse 8. First and second outputs of the rectifier bridge 6 form the first and second outputs of the converter circuit 4 and are coupled to the first and second electrodes of the storage capacitor 31 and to the first and second electrodes of the light circuit 3.

Figure 4:
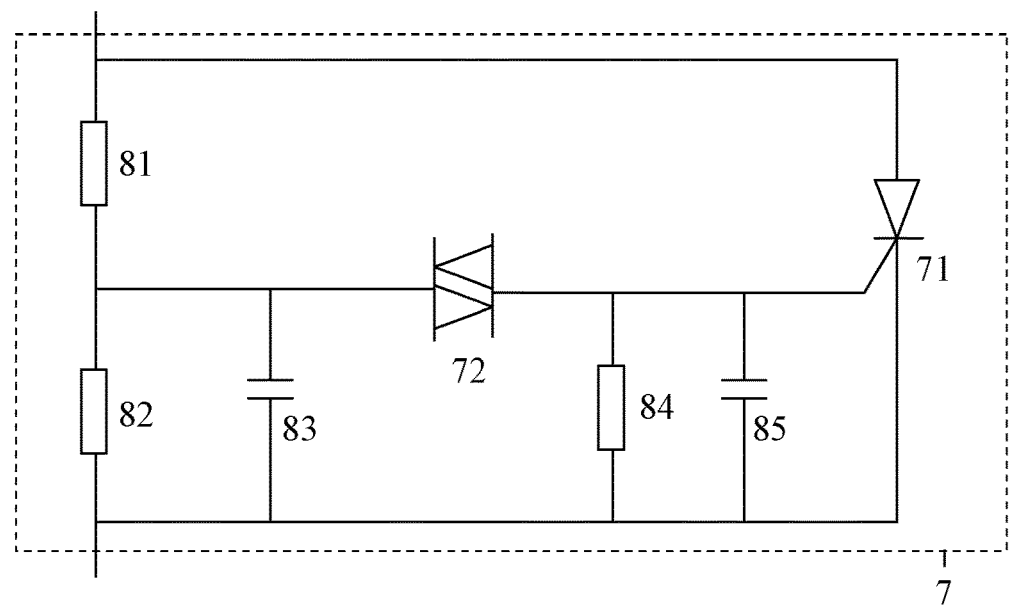
FIG. 4 shows a first embodiment of a monitor circuit.

In the FIG. 4, a first embodiment of a monitor circuit 7 is shown. The monitor circuit 7 is arranged for monitoring one or more parameters of the light source 10 and is arranged for, in response to a monitoring result, short-circuiting the first and second outputs of the converter circuit 4. The monitor circuit 7 comprises a thyristor 71. First and second main electrodes of the thyristor 71 are coupled to the first and second outputs of the converter circuit 4 and to ends of a voltage divider 81, 82 comprising two serially connected resistors 81, 82. A control electrode of the thyristor 71 is coupled via a diac 72 to an output of the voltage divider 81, 82. This output is further coupled to the second output of the converter circuit 4 via a capacitor 83. The control electrode of the thyristor 71 is further coupled to the second output of the converter circuit 4 via an optional parallel circuit of a resistor 84 and a capacitor 85. This monitor circuit 7 introduces an over-voltage protection. When an amplitude of a voltage signal present across the first and second outputs of the converter circuit 4 becomes too large (for example as a result of the light circuit 3 becoming disconnected during an operation of the light source 10), the thyristor 71 will short-circuit these first and second outputs etc. Instead of the diac 72, a zener diode may be used. The second output of the converter circuit 4 may be coupled to ground.

Figure 5:
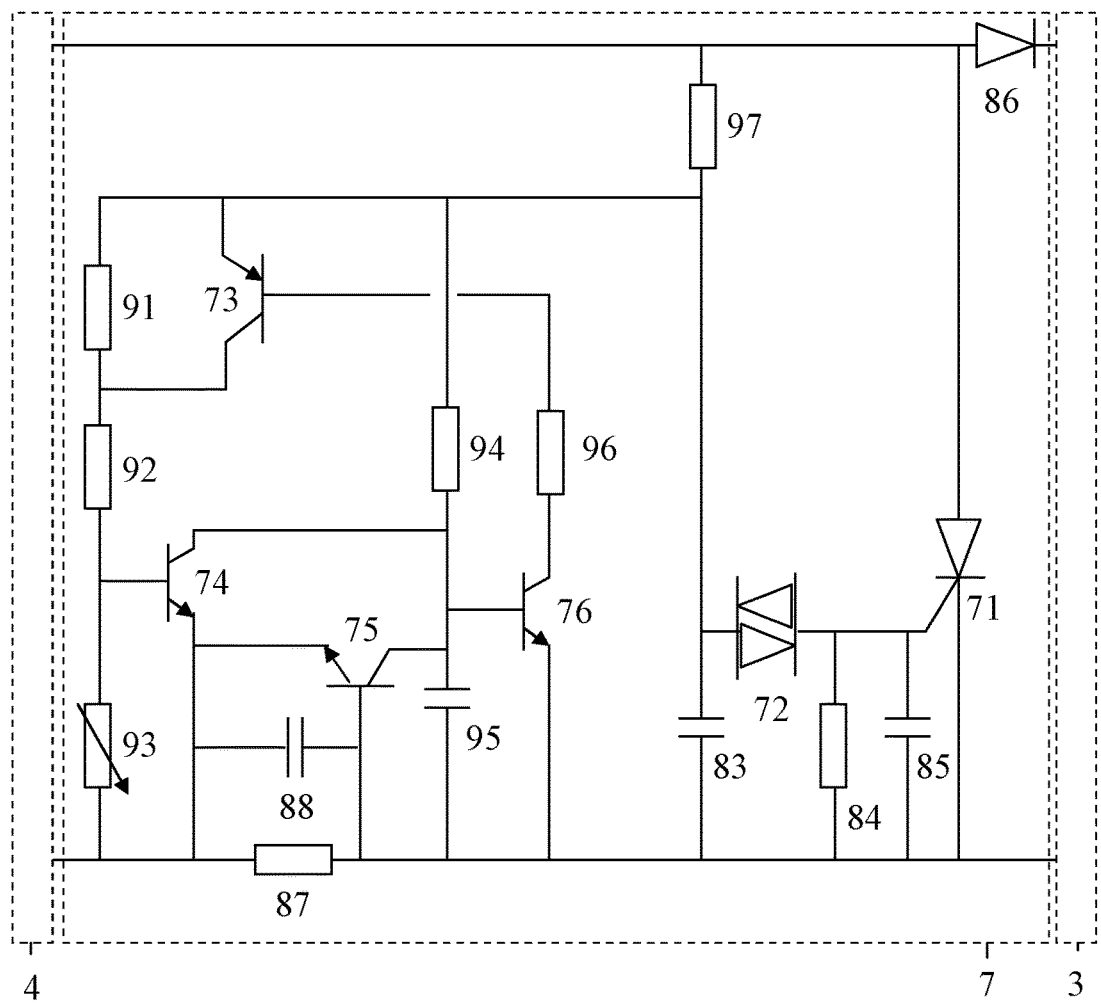
FIG. 5 shows a second embodiment of a monitor circuit.

In the FIG. 5, a second embodiment of a monitor circuit 7 is shown. Again, the monitor circuit 7 is arranged for monitoring one or more parameters of the light source 10 and is arranged for, in response to a monitoring result, short-circuiting the first and second outputs of the converter circuit 4. The monitor circuit 7 comprises a thyristor 71. A first main electrode of the thyristor is coupled to an anode of a diode 86 and to the first output of the converter circuit 4. A cathode of the diode 86 is coupled to the first electrode of the light circuit 3. A second main electrode of the thyristor 71 is coupled to a first side of a resistor 87 and to the second electrode of the light circuit 3. A second side of the resistor 87 is coupled to the second output of the converter circuit 4 that may be coupled to ground. A control electrode of the thyristor 71 is coupled via a diac 72 to an output of a transistor circuit 73-76 and is coupled via an optional parallel circuit of a resistor 84 and a capacitor 85 to the first side of the resistor 87. The resistor 87 is coupled in parallel to a capacitor 88. The second side of the resistor 87 may be coupled to ground. Instead of the diac 72, a zener diode may be used.

The output of the transistor circuit 73-76 is realized by a first main electrode of a transistor 73, that is further coupled to first sides of resistors 91, 94, 97 and to a first side of a capacitor 83. A second side of the resistor 91 is coupled to a first side of a resistor 92 and to a second main electrode of the transistor 73. A second side of the resistor 92 is coupled to a first side of a resistor 93, such as for example a temperature dependent resistor, such as for example a positive temperature coefficient resistor, and to a control electrode of a transistor 74. A first main electrode of the transistor 74 and a second side of the resistor 93 and a first main electrode of a transistor 75 are coupled to the second side of the resistor 87. A second main electrode of the transistor 74 is coupled to a second side of the resistor 94 and to a first side of a capacitor 95 and to a second main electrode of the transistor 75. A control electrode of the transistor 75 is coupled to the first side of the resistor 87. A second side of the capacitor 95 and a first main electrode of the transistor 76 are coupled to the first side of the resistor 87. A second main electrode of the transistor 76 is coupled via a resistor 96 to a control electrode of the transistor 73. A second side of the resistor 97 is coupled to the anode of the diode 86. A second side of the capacitor 83 is coupled to the first side of the resistor 87.

This monitor circuit 7 introduces an over-voltage protection via the resistors 97, 91, 92, 93 and introduces an over-current protection via the resistor 87 and introduces an over-temperature protection via the resistor 93. In a normal situation, the transistors 73 and 76 are conducting. When an amplitude of a voltage signal present across the first and second outputs of the converter circuit 4 becomes too large (for example as a result of the light circuit 3 becoming disconnected during an operation of the light source 10), the voltage level at the second side of the diac 72 becomes too high, the diac 72 breaks down and the thyristor 71 starts conducting thereby short-circuiting the first and second outputs of the converter circuit 4. When an amplitude of a current signal flowing through the resistor 87 becomes too large, the transistor 75 starts conducting, the transistor 76 stops conducting, the transistor 73 stops conducting, and the voltage level at the second side of the diac 72 becomes too high, the diac 72 breaks down and the thyristor 71 starts conducting thereby short-circuiting the first and second outputs of the converter circuit 4. When a temperature as measured via the resistor 93 becomes too high, the transistor 74 starts conducting, the transistor 76 stops conducting, the transistor 73 stops conducting, and the voltage level at the second side of the diac 72 becomes too high, the diac 72 breaks down and the thyristor 71 starts conducting thereby short-circuiting the first and second outputs of the converter circuit 4. This short-circuiting is done here via the resistor 87, but this resistor 87 will usually have a relatively small and therefore negligible impedance value etc.

In the FIG. 5, but not shown, the storage capacitor 31 as shown in the FIGS. 2 and 3 may be present between the monitor circuit 7 and the light circuit 3. Preferably, the storage capacitor 31 will be coupled to the cathode of the diode 86, to prevent that the storage capacitor 31 is de-charged via the monitor circuit 7. Once the thyristor 71 has been brought into a conducting mode, it will stay in this conducting mode owing to the fact that it will not be able to react to the zero-crossings in the high-frequency current flowing through it. So, the monitor circuit 7 will bring the thyristor 71 into the conducting mode and will thereby switch off the light circuit 3. As an advantageous consequence, the light circuit 3 will not suffer from undesired flickering. A way to reset the thyristor 71 and a way to reset the entire monitor circuit 7 may be to disconnect the light source from the high-frequency ballast or to disconnect the high-frequency ballast from a mains supply etc.

So, the one or more parameters as monitored by the monitor circuit 7 may comprise a first parameter defined by an amplitude of a voltage signal present across the first and second outputs of the converter circuit 4 and a second parameter defined by an amplitude of a current signal flowing through the light circuit 3 and a third parameter defined by a temperature of the part of the light source 10. Alternatively, the second parameter and/or the third parameter may be monitored via the fuse 8.

Figure 6:
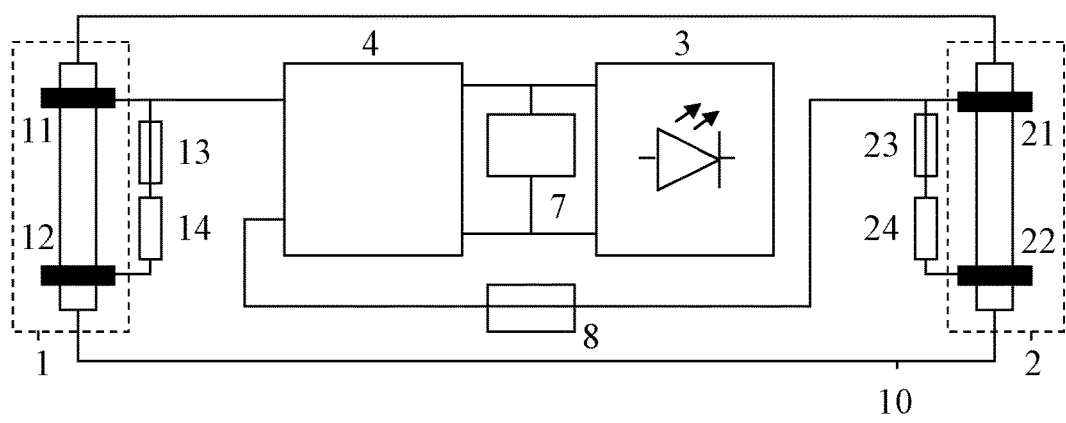
FIG. 6 shows a second embodiment of a light source.

In the FIG. 6, a second embodiment of a light source 10 is shown. This second embodiment differs from the first embodiment as shown in the FIG. 1 in that the pins 12, 22 are no longer not connected. The two first pins 11, 12 are interconnected via a first interconnection circuit 13, 14 and the two second pins 21, 22 are interconnected via a second interconnection circuit 23, 24. The first interconnection circuit 13, 14 may comprise a first fuse 13 and a first resistor 14 connected serially, and the second interconnection circuit 23, 24 may comprise a second fuse 23 and a second resistor 24 connected serially. This second embodiment can be used for a high-frequency ballast in the form of a programmed start ballast, when both pins per terminal 1, 2 are required. For a high-frequency ballast in the form of an instant start ballast, only one of the two pins per terminal 1, 2 needs to be used.

Figure 7:
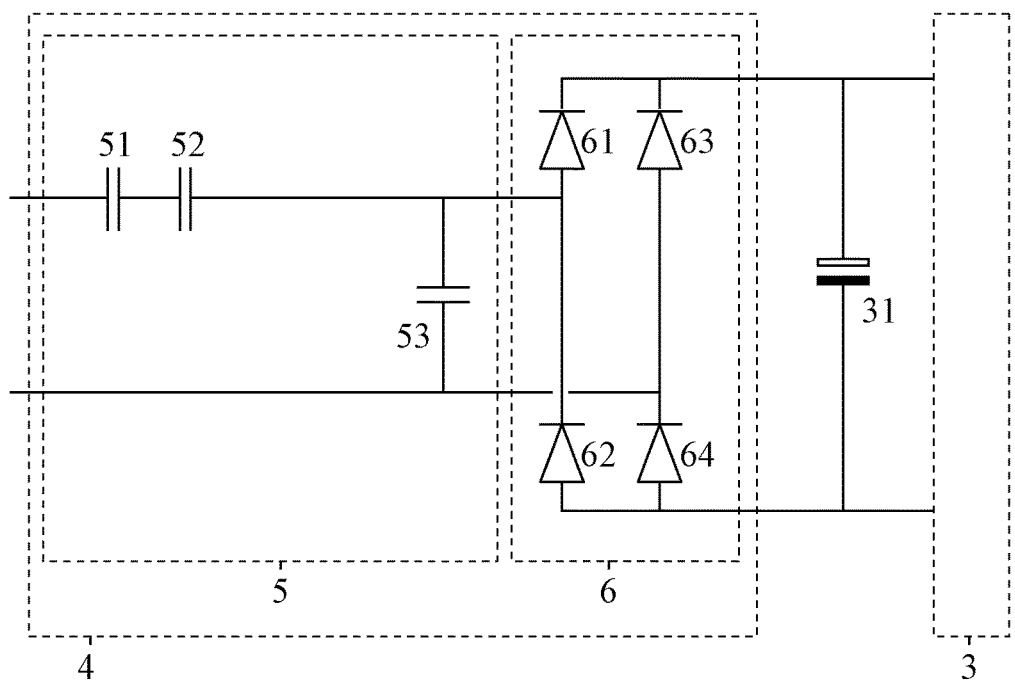
FIG. 7 shows a third embodiment of a converter circuit.

In the FIG. 7, a third embodiment of a converter circuit 4 is shown, wherein, compared to the first embodiment shown in the FIG. 2, the reactive circuit 5 only comprises the two or more serially connected protecting capacitors 51, 52 coupled to the pin 11 and to the first input of the rectifier bridge 6 and a first capacitive element 53 coupled to the first and second inputs of the rectifier bridge 6.

Figure 8:
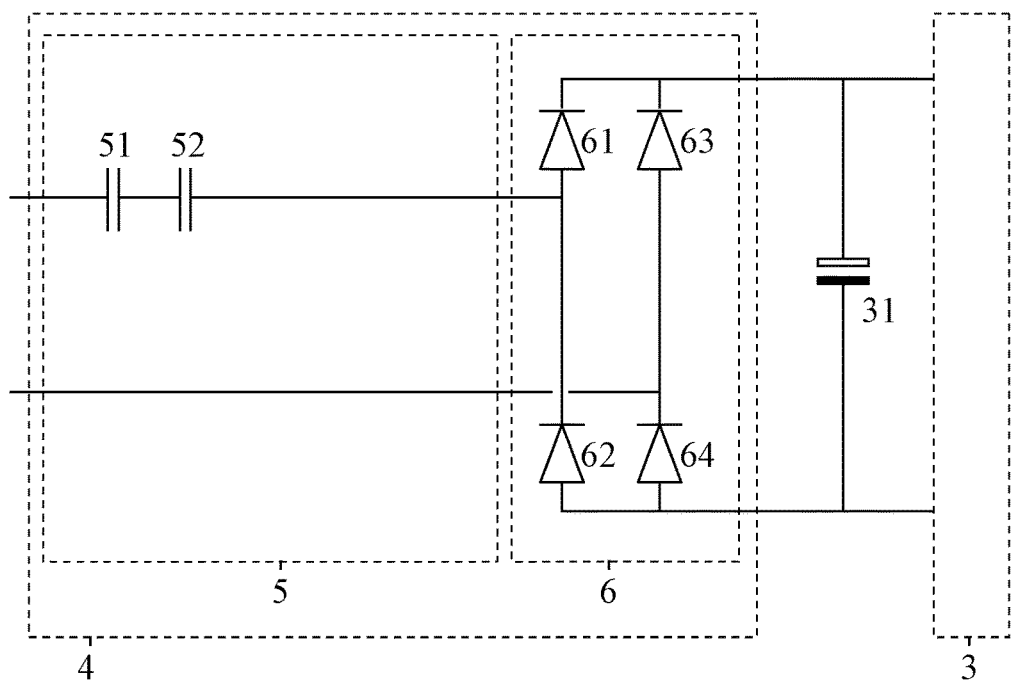
FIG. 8 shows a fourth embodiment of a converter circuit.

In the FIG. 8, a fourth embodiment of a converter circuit 4 is shown, wherein, compared to the first embodiment shown in the FIG. 2, the reactive circuit 5 only comprises the two or more serially connected protecting capacitors 51, 52 coupled to the pin 11 and to the first input of the rectifier bridge 6.

The light sources 10 have been designed for replacing a fluorescent lamp while keeping the high-frequency ballast.

Other kinds of first and second signals are not to be excluded. Other shapes of the light source 10 than tubes are not to be excluded. Other locations for the fuse 8 such as for example a current path between the pin 11 and the first input of the converter circuit 4 are not to be excluded. First and second elements may be coupled directly or may be coupled indirectly via a third element.

Summarizing, light sources 10 for replacing fluorescent lamps comprise light circuits 3 with light emitting diodes, first and second terminals 1, 2 located at first and second ends of the light sources 10 for exchanging first signals with high-frequency ballasts, and converter circuits 4 for converting the first signals into second signals for feeding the light circuits 3. The converter circuits 4 comprise reactive circuits 5 for matching the light circuits 3 and the high-frequency ballasts and provide safety to persons when installing the light sources 10. The light sources 10 may further comprise protection circuits 7, 8 for protecting parts of the light sources 10 against problems. The protection circuits 7, 8 may comprise monitor circuits 7 for monitoring parameters of the light sources 10 and for in response to monitoring results short-circuiting outputs of the converter circuits 4, and fuses 8. The reactive circuits 5 may comprise protecting capacitors 51, 52.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light source, comprising:
   first and second terminals for exchanging a first signal with a high-frequency ballast, the first terminal being located at a first end of the light source and the second terminal being located at a second end of the light source,
   a light circuit with one or more light emitting diodes, and
   a converter circuit for converting the first signal into a second signal for feeding the light circuit, the converter circuit comprising a reactive circuit and a rectifier bridge, the rectifier bridge having a first input and a second input, and
   wherein the reactive circuit comprises one protecting capacitor or two or more serially connected protecting capacitor, with the one protecting capacitor or the two or more serially connected protecting capacitors being coupled between the first terminal and the first input of the rectifier bridge, with the second terminal being coupled to the second input of the rectifier bridge, wherein the monitor circuit comprises a thyristor, first and second main electrodes of the thyristor being coupled to the first and second outputs of the converter circuit, a control electrode of the thyristor being coupled via a diac or a zener diode to an output of a transistor circuit or an output of a voltage divider for said monitoring, and wherein the control electrode of the thyristor is further coupled to the second output of the converter via resistor and a capacitor.

2. The light source as defined in claim 1, wherein the output of the voltage divider or the transistor circuit further is coupled to the second output of the converter circuit via a capacitor.

3. The light source as defined in claim 1, wherein the monitor circuit is configured to monitor also a temperature of a part of the light source.

4. The light source as defined in claim 3, the protection circuit comprising
a fuse.

5. The light source as defined in claim 1, the first terminal comprising two first pins interconnected via a first interconnection circuit, and the second terminal comprising two second pins interconnected via a second interconnection circuit.

6. The light source as defined in claim 1, the light source being designed for replacing a fluorescent lamp while keeping the high-frequency ballast.

7. The light source as defined in claim 1, the rectifier bridge consisting of four diodes, or the rectifier bridge consisting of two diodes and two voltage-doubling capacitors.

8. The light source as defined in claim 1, the one protecting capacitor or the two or more serially connected protecting capacitors being coupled to the first input of the rectifier bridge via an inductive element.

9. The light source as defined in claim 1, wherein the first input of the rectifier bridge and the second input of the rectifier bridge are coupled to each other via a first capacitive element.

10. The light source as defined in claim 1, a first electrode of the inductive element being coupled via the first capacitive element to the second input of the rectifier bridge, or first and second electrodes of the inductive element being coupled via the first capacitive element and a second capacitive elements to the second input of the rectifier bridge.

11. The light source as defined in claim 1, first and second outputs of the rectifier bridge being first and second outputs of the converter circuit, these first and second outputs being coupled to first and second electrodes of a storage capacitor and to first and second electrodes of the light circuit.

12. The light source as defined in claim 1, further comprising a protection circuit for protecting a part of the light source comprising a monitor circuit for monitoring an amplitude of a voltage and/or a current signal present across the first and second outputs of the converter circuit and for in response to a monitoring result short-circuiting first and second outputs of the converter circuit.

* * * * *